Jan. 9, 1962   L. R. KOLLER ET AL   3,016,307
FORMATION OF PHOSPHOR FILMS OF REACTION
Filed March 13, 1959
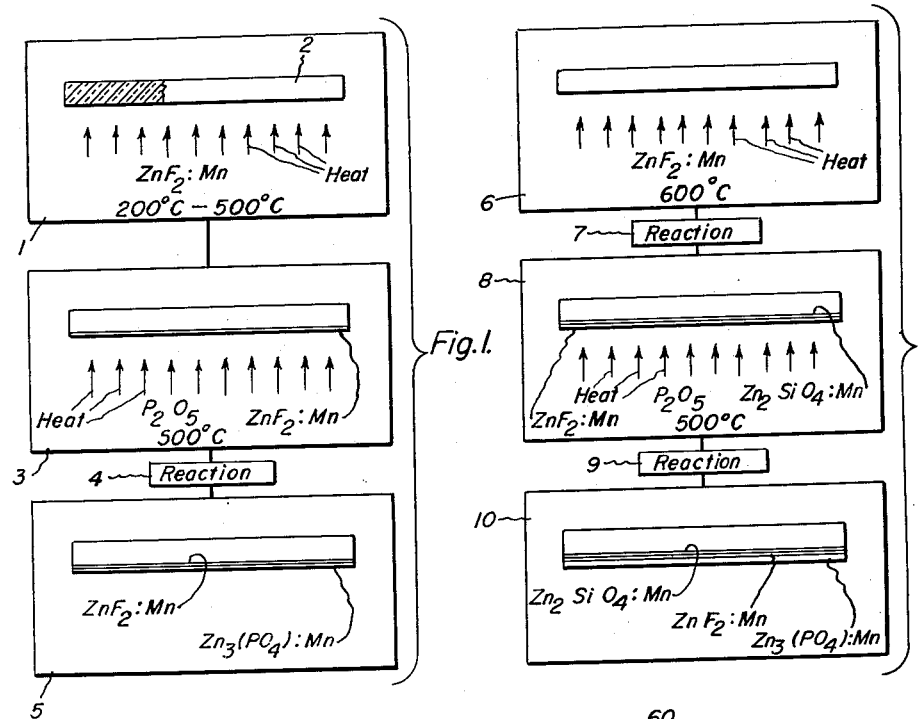
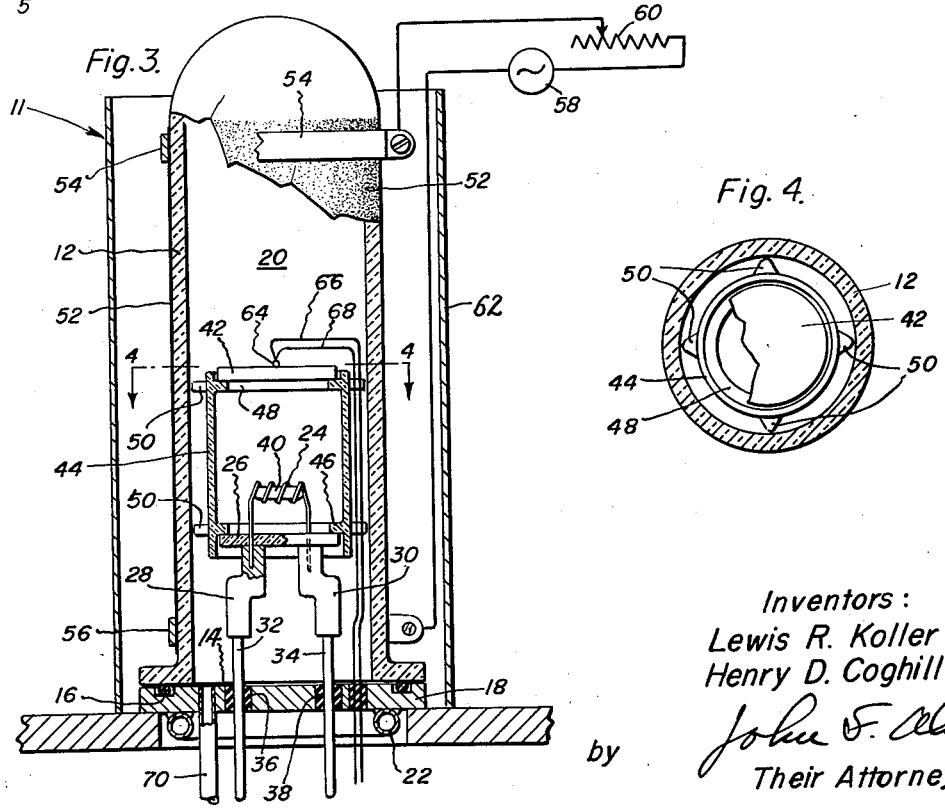
Inventors:
Lewis R. Koller;
Henry D. Coghill,
by
Their Attorney.

3,016,307
FORMATION OF PHOSPHOR FILMS OF REACTION
Lewis R. Koller, Schenectady, and Henry D. Coghill, Burnt Hills, N.Y., assignors to General Electric Company, a corporation of New York
Filed Mar. 13, 1959, Ser. No. 799,189
8 Claims. (Cl. 117—33.5)

This invention relates to cathodoluminescent screens of the multilayer or Penetron type and more particularly to methods of forming such screens by controlled reactions.

Luminescent screens are effective to visually portray certain types of information and are useful as screens in television tubes, cathode ray oscilloscopes, radar tubes and the like. In certain uses of luminescent screens, it is advantageous and desirable to superimpose or to simultaneously portray different kinds of information on the same screen in a readily and clearly distinguishable manner. As an example, on a radar screen it may be advantageous to clearly and readily distinguish the coordinates of a chart or a map from the targets or other indicated objects on the screen. Since the normal human eye is sensitive in discerning different colors, the presentation of the different forms of information on such a screen in different colors is an effective manner of distinguishing the different kinds of information on the same screen.

It is known that electrons penetrating a phosphor give up relatively more of their energy at the end of their range than in the initial portion when their velocity is high. Accordingly, the excitation at different depths in a phosphor screen by an electron beam will depend on the energy of the electrons in the beam. Thus, luminescent screens having multiple layers of phosphors emitting different colors of visible light may be excited by electron beams of different energies to produce different visual indications on the same screen. Electrons may be used to excite a phosphor layer on the side of another phosphor layer remote from an electron gun by imparting sufficient energy to the electrons of the beam so that they penetrate the nearest layer at great speed and are decelerated to low speeds in the second layer. The electrons while penetrating the first layer at high speed produce only slight excitaton of the phosphor and since their travel at low speed occurs in the second layer, the excitation thereof is great. For exciting only the layer nearest the electron gun, the electron energy need be less than that required to pass through the layer.

The Penetron multilayer type phosphor screens are known and have been effectively produced with certain types of phosphor material. However, in producing Penetron multilayer type phosphor screens with certain materials, particularly the oxygen containing phosphors, certain major difficulties arise wherein it is either very difficult to readily deposit the phosphors by evaporation or the phosphors decompose when so evaporated. Penetron multilayer screens produced by superimposing an oxygen containing phosphor on another phosphor merely by evaporation are generally of low efficiency and of poor quality, due to the difficulties mentioned.

It is therefore a principal object of our invention to produce luminescent screens of phosphor materials that are difficult to evaporate or have a tendency to decompose upon evaporation.

It is another object of our invention to produce multilayer type Penetron luminescent screens by a process involving reaction between phosphor materials.

In accordance with a feature of our invention, Penetron luminescent screens are formed by a sequential vapor deposition of materials, one of which may be a phosphor, on a screen substrate under conditions conducive to a controlled reaction between such deposited materials to produce a phosphor as a reaction product, in addition to the deposited phosphor, to form a finished screen of multiple layers of luminescent materials. An initial phosphor capable of being readily deposited by evaporation is first deposited on the substrate under controlled conditions. A predetermined quantity, less than a stoichiometric quantity for complete reaction with the initial phosphor, of a second material reactive with the initial phosphor to produce another phosphor, is then deposited on the initially deposited phosphor under controlled conditions whereby a predetermined and controlled reaction occurs between the phosphors to produce the multilayer luminescent screen of desired luminescent characteristics.

In accordance with our invention, a three layer luminescent screen may be formed by first producing a two layer Penetron in accordance with a method set forth and claimed in the patent application of Lewis R. Koller, Serial No. 724,181, filed March 26, 1958, entitled, "Luminescent Screens and the Production Thereof" and assigned to the present assignee, now Patent Number 2,983,-816, issued May 9, 1961, and thereafter utilizing the method described herein for producing a two layer screen, whereby the process as a whole produces a three layer and three color Penetron screen. As described herein before the screens produced in accordance with our invention are responsive to cathode ray bombardment of different electron energies to produce visible light of two or three different colors.

The novel features believed characteristic of the present invention are set forth in the appended claims. The invention itself, together with further objects and advantages thereof, may thus be understood with reference to the appended drawing in which:

FIGS. 1 and 2 are diagrams illustrating the steps of forming the respective two and three layer Penetron screens of our invention, and FIGS. 3 and 4 illustrate an evaporating apparatus useful in carrying out the processes of this invention.

While our invention is applicable for the preparation of many different multilayer phosphor screens, for brevity and simplicity in explanation, it will be set forth and described with respect to its applicability to reactions of manganese activated zinc fluoride phosphors with phosphorous pentoxide.

Explaining the fundamental principles of our invention, reference is now made to FIGS. 1 and 2 of the drawings illustrating, in block form, two different embodiments of our invention. In FIG. 1 the first step of the process of forming a two layer Penetron is shown in block 1 wherein a substrate 2 is coated with a suitable phosphor material such as zinc fluoride activated by 5 percent by weight of manganese ($ZnF_2$:5 percent Mn) by evaporation in an evacuated chamber at a temperature of 200° C. to 500° C. In this step of the process, a layer of phosphor material approximately 1 to 2 microns thick is produced on the substrate. Thereafter, during the second step of the process as shown in block 3, the zinc fluoride coated substrate is exposed to evaporation of phosphorous pentoxide ($P_2O_5$) in an evacuated chamber at 500° C. The phosphorous pentoxide is reactive with zinc fluoride to form zinc phosphate [$Zn_3(PO_4)_2$]. The quantity of phosphorous pentoxide utilized is predetermined to prevent reaction of the entire quantity of zinc fluoride on the layer with the phosphorous pentoxide if a two layer Penetron is desired. That is to say, the quantity of phosphorous pentoxide evaporated is such that less than a stoichiometric quantity required to produce complete reaction with zinc fluoride is deposited on the zinc fluoride layer. Thus, after the reaction occurs represented at block 4, a finished screen is produced with two layers of luminescent material, namely zinc fluoride activated with manganese and zinc phosphate activated with manganese as shown in block 5. In this manner a complete two layer Penetron multilayer type luminescent screen is produced. It is to be understood, of course, that if a single layer of zinc phosphate material is desired to be deposited on the screen 2, a greater quantity of phosphorous pentoxide is evaporated in the chamber as shown in block 3. That is, the quantity of phosphorous pentoxide would be such that a stoichiometric quantity is applied to the zinc fluoride layer and the entire quantity of zinc fluoride reacts with the entire quantity of phosphorous pentoxide to produce zinc phosphate.

As shown in FIG. 2 of the drawing, the principles of our invention are applicable to produce a three layer Penetron. As shown in blocks 6, 7 and 8, a substrate may be coated with successive layers of zinc silicate and zinc fluoride both activated by manganese in a manner shown and described in the above-mentioned patent application of Lewis R. Koller. This process involves the evaporation of zinc fluoride phosphor activated by manganese in a chamber having a substrate which contains predominantly an oxide of the element which constitutes the central atom of the complex phosphor anion to be formed. In the process, the evaporated fluoride salt here shown to be zinc fluoride attacks the predominant oxide of the glass, forming a surface adjacent region of a luminescent substance comprising the cation of the fluoride salt and an inorganic, oxygen containing complex ion containing the aforementioned central atom. Specifically herein, the zinc fluoride forms a zinc silicate upon reaction with the substrate as shown in block 8. In carrying out this aforementioned process, the quantity of zinc fluoride evaporated exceeds the amount which reacts with the glass to form the zinc silicate. Thus, as shown in block 8 of the drawing, a further layer of zinc fluoride is deposited on the substrate superimposed on the layer of zinc silicate. Thereafter, in accordance with the feature of our invention and as shown in block 8, a quantity of phosphorous pentoxide is evaporated in an evacuated chamber containing the substrate having the zinc fluoride and zinc silicate deposited thereon and the quantity of phosphorous pentoxide is predetermined so as to prevent a complete reaction of the zinc fluoride phosphor. That is to say, less than a stoichiometric quantity of phosphorous pentoxide with respect to this reaction is utilized whereby the entire quantity of phosphorous pentoxide deposited on the substrate reacts with the zinc fluoride as represented by block 9 to produce an additional layer of zinc phosphate as shown at block 10 in the drawing.

Referring now to FIGS. 3 and 4 of the drawing, 11 represents generally the entire improved apparatus for forming the present invention and comprises a structure including a hollow bell jar 12 preferably of circular cross section closed at one end and engageable at its open end 14 with a sealing O-ring 16, mounted in a groove in a base 18 to provide a confined region 20 within the jar that may be isolated from ambient space. The region 20 within the jar accommodates further apparatus for performing the present invention and the base 18 is apertured to accommodate electrical connections and a tube leading to the region 20 for facilitating proper conditioning and operation of the apparatus within the jar as hereinbelow more fully set forth. The O-ring 16 is made of rubber, plastic or other suitable resilient sealing material and to prevent the destruction thereof by excessive heat, it is maintained relatively cool by a coolant circulated in a cooling ring 22 which is preferably welded or soldered to base 18.

The apparatus within the bell jar 12 includes a suitable phosphor pellet evaporating structure which may be a helical resistant unit 24 with its end extending through a ceramic baffle 26 and having its ends conductively connected to respective conducting supporting members 28 and 30. The baffle 26 and unit 24 are supported by the supporting members 28 and 30 which are in turn supported by and connected to electrical conductors 32 and 34 passing through base 18. Insulators 36 and 38 surrounding portions of the conductors 32 and 34, insulate the same from base 18. It is to be understood that although only one evaporating structure is shown in the drawings and described herein, it is within the purview of our invention to provide a pair or more of evaporating units to be used successively without the necessity of dismantling the apparatus and inserting additional phosphor pellets in the single evaporator for successive evaporation of a plurality of pellets.

For confining the gases formed by a vaporizable pellet 40, and exposing a substrate 42 to such gases, an evaporation enclosure 44, preferably circular and uniformly spaced from the walls of bell jar 12, is provided with an interior flange 46 near one end engageable with baffle 26 to support the enclosure and with a further interior flange 48 near the other end for supporting substrate 42. The enclosure 44 may be quartz glass of sufficient thickness to provide the required strength under the circumstances and may further be provided with a plurality of lobes as shown at 50 in FIG. 4 as well as in FIG. 3, for properly centering of the enclosure within the bell jar 12. Thus, the substrate 42 which may be a Pyrex disk approximately 2 inches in diameter and ⅛ inch thick in the processes disclosed herein, is exposed on one side to the interior of the evaporating enclosure 44 for receiving an evaporated phosphor. The exposed surface of substrate 42 may be coated with an oxide of titanium in some cases, as may be desired.

To facilitate heating of the interior of the bell jar, a thin resistance coating 52 about a portion of the exterior surface of bell jar 12 is contacted with a pair of ring electrodes 54 and 56 provided and which are connected to a controllable source of electrical potential represented by an alternating current generator 58 and potentiometer 60. Resistance coating 52 serves as a heater when an electrical current is passed therethrough by means of spaced ring electrodes 54 and 56 and is the means by which substrate 42 is heated in accordance with the present invention. A suitable heat shield 62 of suitable material such as aluminum, telescopically fitting over the apparatus may be provided to isolate the same from ambient convection currents.

To control the heating of the substrate, the temperature thereof may be determined by a thermocouple 64 contacting a central surface portion thereof remote from the surface to be coated and wire connections 66 and 68 from the thermocouple lead to a suitable meter, not shown, to yield a temperature determination. The thermocouple 64 uitlized in the processes of our invention may be of conventional character and need only be useful at the range of temperatures involved. The wire connections 66 and 68 extend through the base 18 and are suitably insulated therefrom.

The atmosphere in the bell jar 12 and evaporating enclosure 44 may be evacuated to a very low pressure by a vacuum pump, not shown, communicating with the interior of the bell jar through a conduit 70 extending through the base 18.

Although the bell jar 12 may in certain instances be made of Pyrex, Vycor, or other high temperature glasses, we preferably utilize quartz therefor, since resistive layers which serve as the substrate heaters resist deterioration upon quartz surfaces at higher temperatures than they resist deterioration upon other glass surfaces. The materials from which support members 28 and 30 are fabricated are not critical and may conveniently be tungsten, molybdenum, platinum or any other material conveniently utilized in this application. Resistance coating 52 upon the surface of bell jar 12 may conveniently be tin oxide formed by the hydrolysis of tin tetrachloride.

In performing the process of our invention, a suitable substrate as shown at 42 is disposed in the bell jar on the flange 48 and a pellet 40 of suitable phosphor material is disposed in helical heater 24. The apparatus is assembled as shown in FIG. 3 of the drawing and the interior of the bell jar is evacuated through conduit 70 to a very low value of the order of 1 micron of mercury. Such evacuation is effective to also evacuate the interior of enclosure 44 since the baffle 26 and substrate 42 are not sealingly fitted to their respective flanges 46 and 48 of the enclosure 44 but only impede the flow of gases therepast. The entire apparatus is heated by resistance unit 52 to bring the entire apparatus including the region 20 and substrate 42 to a temperature suitable for the proper deposit of an evaporated phosphor. In the use of zinc fluoride, temperatures of approximately 200° C. to 500° C. are found suitable. To maintain the portion of the base accommodating O-ring 16 cool, a suitable coolant such as tap water is circulated through ring 22. After the entire apparatus reaches a condition of thermal equilibrium, the phosphor pellet 40 is evaporated by passing an electrical current through helical resistance unit 24. In the embodiments of the invention herein set forth, the wire of unit 24 is of platinum of the order of 20 mills in diameter and a potential difference of approximately 6 volts applied across the helix produces a current of the order of 8 amperes in the helix producing a helix temperature of the order of 1500° C. The heat of the helix vaporizes the phosphor pellet and the vapor permeates the region within enclosure 44 and condenses on the surface within the enclosure including the substrate 42. Because the walls are heated to the same temperature as the substrate the deposit is uniform over the entire enclosure and there is no tendency for the walls to act as a sink as they would if they were not heated. After a predetermined period of time sufficient to allow complete evaporation of the pellet, the apparatus in one embodiment employing a single evaporator is allowed to cool to room temperature and the apparatus is dismantled and a pellet of a different material reactive with the condensed phosphor on substrate 42 to produce another desired phosphor as a reaction product, is mounted in the evaporator 24 and the apparatus is reassembled as shown in FIG. 3 of the drawing.

The entire apparatus is again evacuated to a pressure of approximately 1 micron of mercury and the heater 52 is energized to raise the temperature of the entire apparatus to a temperature suitable to produce the desired deposit and reaction. On superimposing phosphorus pentoxide on a zinc fluoride vapor deposit, for example, to form zinc phosphate as a reaction product, a temperature of approximately 450° C. to 550° C. is found suitable. After a predetermined period of time to allow the apparatus to reach a condition of thermal equilibrium, current is passed through the evaporator helix 24 as before and the pellet is evaporated to permeate the region within enclosure 44 and allow condensation of the phosphor material as the second layer of phosphor on the substrate 42.

It is important to control the quantity of second material applied so as to control the extent of the reaction between deposited materials. Thus, in forming zinc phosphate as a reaction product phosphor as hereinabove set forth, if it is desired to produce a two layer Penetron of zinc phosphate and zinc fluoride, it is important to evaporate a quantity of phosphorous pentoxide less than a stoichiometric quantity to produce reaction with the zinc fluoride deposited on the substrate. Thus, after complete reaction of all phosphorus pentoxide deposited on the substrate to produce zinc phosphate as a reaction product, a layer of zinc fluoride still exists between the zinc phosphate and the substrate. Should it be desired to convert the entire layer to zinc phosphate, of course, a sufficient quantity of phosphorus pentoxide would be evaporated to deposit a stoichiometric quantity on the substrate for complete reaction of the phosphorus pentoxide. In addition to utilizing $P_2O_5$ as the last evaporated substance to form a phosphate phosphor layer by reaction with the first evaporated fluoride layer, $P_2O_4$ and $P_2O_7$ may be used. Likewise, $B_2O_3$ may be evaporated to form a borate phosphor by reaction and SiO or $SiO_2$ may be evaporated to form a silicate phosphor by reaction.

The principles of our invention as described herein are equally applicable with phosphor host materials wherein magnesium is substituted for zinc as in magnesium fluoride activated by manganese rather than zinc fluoride activated by manganese. Various Penetron multilayer type luminescent screens utilizing phosphor host materials with zinc as the cation may be prepared in accordance with the principles of our present invention. The compositions of several types of such screens are set forth in the table below together with the colors of cathodoluminescent emission.

| Phosphor | Colors |
| --- | --- |
| $Zn_3(PO_4)_2$: Mn on $ZnF_2$: Mn on $Zn_2SiO_4$: Mn. | Red on Yellow on Green. |
| $Zn_3(PO_4)_2$: Mn on $ZnF_2$: Mn on $Zn_2SiO_4$: Ti. | Red on Yellow on Blue. |
| $Zn_3(PO_4)_2$: Mn on $Zn_2SiO_4$: Mn | Red on Green. |
| $Zn_3(PO_4)_2$: Mn on $Zn_2SiO_4$: Ti | Red on Blue. |

While the invention has been set forth hereinabove with respect to the general practice thereof, the following specific examples are given in order that those skilled in the art may determine specific circumstances under which the invention may be practiced. These examples are set forth in an exemplary manner only and are not to be construed in a limiting sense.

*Example 1.*—A two inch diameter uncoated disk of Pyrex glass, 1/8 inch thick was prepared by polishing with "Precisionite" ($Al_2O_3$) abrasive compound, washed in distilled water and air dried. The substrate was then placed in the apparatus of FIG. 3 in the position of substrate 42. A 0.25 gram compressed pellet of zinc fluoride phosphor activated by 5 percent by weight of manganese was inserted in the helix 24. Bell jar 12 was vacuum sealed to the base 18 and evacuated to a pressure of approximately 1 micron of mercury. Electrical current was passed through resistance 52 raising the temperature of the entire apparatus including the substrate 42 to approximately 200° C. After approximately 10 to 15 minutes for allowing the entire apparatus to reach a condition of thermal equilibrium the phosphor pellet was evaporated by passing a current of approximately 8 amperes through the platinum helix resistance unit 24 and such current was maintained for a period of time sufficient to evaporate the entire pellet which was approximately 1 minute. The evaporated zinc fluoride phosphor condensed on the surface of the substrate exposed to the interior of enclosure 44. The entire apparatus was allowed to cool by removing the electrical energization from both the helical coil 24 and the heater unit 52. Thereafter, a charge of phosphorous pentoxide comprising a 0.1 gram compressed pellet was placed in the helix 24 and the apparatus again arranged for evacuation as shown in FIG. 3 and the interior of the apparatus was evacuated to the pressure of approximately 1 micron of mercury. Electrical energy was supplied to heater 52 to raise the temperature of the entire apparatus to approximately 500° C. and this condition was maintained for approximately 10 to 15 minutes time to allow the entire apparatus to reach thermal equilibrium. Thereafter, a current of approximately 8 amperes was passed through a platinum helix 24 and maintained for approximately 1 minute to completely evaporate the pellet of phosphorous pentoxide. The evaporated phosphorous pentoxide was deposited on the zinc fluoride phosphor layer on the substrate 42 among other places and the phosphorous pentoxide reacted with the zinc fluoride to form a manganese activated zinc phosphate phosphor. The amount of phosphorous pentoxide, however, was less than a stoichiometric quantity with respect to the zinc fluoride. As a consequence, on the substrate was formed a pair of layers of phosphors. A zinc fluoride phosphor activated by manganese was adjacent to the substrate and superimposed on the zinc fluoride phosphor was the zinc phosphate phosphor activated by manganese. The resultant luminescent film was transparent and comprised a two color Penetron multilayer type luminescent screen. The zinc fluoride phosphor emitted yellow light in response to cathode ray excitation at energies greater than 10 kilovolts, and the zinc phosphate phosphor emitted red light in response to cathode ray excitation below 10 kilovolts. The film formed is approximately 2 microns thick.

*Example 2.*—A two inch diameter disk of high silica content, Pyrex glass 1/8 inch, was prepared by polishing with "Precisionite" ($Al_2O_3$) abrasive compound, washed in distilled water and air dried. The substrate was then placed in the apparatus of FIG. 3 in the position of substrate 42. A 0.25 gram compressed pellet of zinc fluoride phosphor containing 5 percent by weight of manganese, as an activator, was disposed in the evaporator helix 24. The bell jar 12 was vacuum sealed to the base 18 and evacuated to a pressure of approximately 1 micron of mercury. Electrical current was supplied to the resistance 52, raising the temperature of the entire apparatus including the substrate 42 to at least 600° C. taking a period of time of approximately 10 to 15 minutes. After maintaining this temperature for approximately an additional 5 minutes, to establish a state of thermal equilibrium of the entire apparatus, the pellet of zinc fluoride was evaporated by passing a current of approximately 8 amperes through the platinum helix 24 for a duration of at least 1 minute, vaporizing the entire pill. Vapor within the enclosure 44 was deposited on the substrate 42 and thereafter the entire apparatus was allowed to cool to room temperature. At this temperature of the substrate, in response to the vaporization of the zinc fluoride phosphor pellet, a chemical reaction occurred between the adjoining surfaces of the deposited phosphor and the glass substrate forming a zinc silicate phosphor ($Zn_2SiO_4$) activated by manganese and a zinc fluoride phosphor activated by manganese was superimposed on the zinc silicate phosphor layer.

The apparatus was dismantled and a .1 gram pellet of phosphorous pentoxide was placed in helix 24, the apparatus reassembled as in FIG. 3 and evacuated to a pressure of approximately 1 micron of mercury. The apparatus was heated to 500° C. and maintained at this temperature for a period of time sufficient to allow the entire structure to reach thermal equilibrium. The pellet was then evaporated by passing a current of approximately 8 amperes through the platinum helix 24. After the evaporation process, the entire apparatus was allowed to cool to room temperature. During this process the phosphorous pentoxide reacted with the zinc fluoride phosphor to form a layer of zinc phosphate superimposed on the layer of zinc fluoride. Thus, a three layer luminescent screen was formed wherein the layer of zinc silicate adjacent to the substrate emits green light in response to the cathode ray excitation at energies greater than 15 kilovolts, the second layer of zinc fluoride emits yellow light in response to cathode ray excitation at energies between 10 kilovolts and 15 kilovolts and the outer layer of zinc phosphate is red in response to cathode ray excitation at energies below 10 kilovolts.

*Example 3.*—A two inch diameter Pyrex glass disk 1/8 inch thick and coated with a .25 micron thick layer of titanium oxide ($TiO_2$) was prepared by polishing with "Precisionite" ($Al_2O_3$) abrasive compound, washed in distilled water and air dried. The substrate was then placed in the apparatus of FIG. 3 in the position of substrate 42. A .2 gram pellet of unactivated zinc fluoride phosphor host material was placed in the helix 24. Bell jar 12 was vacuum sealed to the base 18 and evacuated to a pressure of approximately 1 micron of mercury. Electrical current was passed through resistance 52 raising the temperature of the entire apparatus including the substrate to approximately 600° C. and maintained at this temperature for approximately 5 to 10 minutes in order to allow the entire apparatus to reach a state of thermal equilibrium. The phosphor host material was then evaporated by passing a current of approximately 8 amperes through the platinum helix resistance unit 24 and such current was maintained for a period of time sufficient to evaporate the entire pellet which was approximately 1 minute. The evaporated zinc fluoride phosphor host material condensed on the surfaces of the entire of the enclosure 44 including the substrate 42. The entire apparatus was allowed to cool by removing the electrical energization from both the helical coil 24 and the heater unit 52. The zinc fluoride reacted with the silicates of the glass to form a zinc silicate compound ($Zn_2SiO_4$:Ti), which was formed into an activated phosphor by the titanium coated on the glass. The amount of zinc fluoride material evaporated, however, was in such abundance as to prevent the reaction from converting all of the zinc fluoride into the zinc silicate. Thus, a layer of zinc silicate phosphor activated by titanium was formed adjacent to the substrate as a layer and a layer of zinc fluoride was produced adjacent to the layer of zinc silicate. After the entire apparatus was allowed to cool to room temperature it was dismantled and a .1 gram of phosphorous pentoxide with 5 percent by weight of manganese was disposed in the evaporator helix 24 and the entire apparatus reassembled as shown in FIG. 3 of the drawing. The envelope was evacuated to a pressure of less than 1 micron of mercury and elevated to a temperature of 500° C. After a period of at least 10 minutes to allow the apparatus to reach thermal equilibrium, the phosphorous pentoxide pellet was evaporated by passing a current of approximately 8 amperes through the platinum helix 24 and maintained for a period of about 1 minute. The phosphorous pentoxide vapor was deposited on the interior walls of enclosure 44 including the layer of zinc fluoride on the substrate 42 and a reaction occurred between the phosphorous pentoxide and zinc fluoride to form an additional layer of zinc phosphate activated by manganese whereby a three layer Penetron luminescent screen was formed. The zinc silicate activated by titanium emits blue light in response to cathode ray bombardment at energies greater than 15 kilovolts, the zinc fluoride activated by manganese emits yellow light in response to cathode ray bombardment at energies between 10 kilovolts and 15 kilovolts and the zinc phosphate emits red light in response to cathode ray bombardment at energies less than 10 kilovolts.

While the invention has been described with respect to particular examples in the foregoing disclosure many modifications and changes will immediately occur to those skilled in the art without departing from the invention. Accordingly, we intend by the appended claims to cover all such modifications and changes as fall within the true spirit and scope of the foregoing disclosure.

What we claim as new and desire to secure by Letters Patent of the United States is:

1. A method of producing a luminescent screen comprising the steps of heating a screen substrate in an evacuated enclosure, evaporating a fluoride phosphor selected from the group consisting of zinc fluoride and magnesium fluoride in the region adjacent to said substrate, said evaporated phosphor condensing on said substrate, evaporating in said evacuated enclosure in the region of said substrate less than a stoichiometric quantity of an oxygen containing compound which is reactive with said evaporated phosphor to form a luminescent oxygen containing phosphor selected from the group consisting of phosphates, borates and silicates to form a multilayer luminescent screen having said fluoride phosphor and a phosphor formed by reaction as the separate layers thereof.

2. A method of preparing a luminescent screen comprising the steps of heating a screen substrate in an evacuated enclosure, evaporating a phosphor selected from the group consisting of zinc fluoride and magnesium fluoride in the region adjacent to said substrate, said evaporated phosphor condensing on said substrate, evaporating in said evacuated enclosure in the region of said substrate less than a stoichiometric quantity of a compound selected from the group consisting of phosphates, borates, and silicates reactive with said phosphor to form an oxygen containing phosphor to form a multilayer luminescent screen having said fluoride phosphor and a phosphor formed by reaction as the separate layers thereof.

3. A method of preparing a luminescent screen comprising the steps of heating a silica containing screen substrate in an evacuated enclosure, evaporating a fluoride phosphor selected from the group consisting of zinc fluoride and magnesium fluoride in the region adjacent to said substrate, said phosphor reacting with said substrate to form a layer of silicate phosphor thereon covered with a layer of fluoride phosphor, evaporating in said evacuated enclosure in the region of said substrate less than a stoichiometric quantity of an oxygen containing compound which is reactive with said fluoride phosphor to form a luminescent oxygen containing phosphor selected from the group consisting of phosphates, borates and silicates to form a multilayer luminescent screen having said fluoride and said silicate and oxygen containing phosphors formed by reaction as the separate layers thereof.

4. A method of producing a luminescent screen comprising the steps of heating a silica containing screen substrate to reaction temperature in an evacuated enclosure, evaporating a fluoride phosphor selected from the group consisting of zinc fluoride and magnesium fluoride in the region adjacent to said substrate while maintaining said substrate at said temperature, said phosphor reacting with the material of said substrate to form a silicate containing phosphor adjacent to said substrate and a phosphor adjacent to said silicate containing phosphor, evaporating in said evacuated enclosure in the region of said substrate, less than a stoichiometric quantity of a compound which is reactive with the phosphor on the outer layer of said substrate to form another phosphor selected from the group consisting of phosphates, borates and silicates to form a multilayer luminescent screen having said fluoride phosphor and said phosphors formed by reactions as the separate layers thereof.

5. A method of producing a luminescent screen comprising the steps of heating a silica containing screen substrate in an evacuated enclosure, evaporating a phosphor selected from the group consisting of magnesium fluoride and zinc fluoride in the region adjacent to said substrate, said evaporated phosphor condensing on said substrate and a portion of said evaporated phosphor reacting with the material of said substrate to form a silicate containing phosphor by reaction, evaporating in said evacuated enclosure in the region of said substrate less than a stoichiometric quantity with respect to the remaining fluoride on said substrate of an oxygen containing compound selected from the group consisting of phosphates, borates and silicates reactive with said fluoride phosphor to form an oxygen containing phosphor by reaction therewith whereby a multilayer luminescent screen having said silicate, fluoride and further oxygen containing phosphor as layers thereof.

6. A method of producing a luminescent screen comprising the steps of heating a screen substrate in an evacuated enclosure, evaporating a fluoride selected from the group consisting of zinc fluoride and magnesium fluoride upon one surface of said substrate, said evaporated fluoride condensing thereupon, evaporating in an evacuated enclosure in the region of said substrate an oxygen containing compound which is reactive with said first evaporated fluoride to form a luminescent oxygen containing phosphor selected from the group consisting of phosphates, borates and silicates, said fluoride and said oxygen containing compound reacting to form as a reaction product a luminescent phosphor layer.

7. A method of preparing a luminescent screen comprising the steps of heating a screen substrate in an evacuated enclosure, evaporating a compound selected from the group consisting of zinc fluoride and magnesium fluoride upon one surface of said substrate, said evaporated compound condensing thereupon, evaporating in said evacuating enclosure in the region of said substrate a compound selected from the group consisting of phosphates and borates and silicates which are reactive with said fluoride to form an oxygen containing luminescent phosphor by reaction therewith.

8. A method of preparing a luminescent screen comprising the steps of heating a screen substrate in an evacuated enclosure, evaporating a compound selected from a group consisting of zinc fluoride and magnesium fluoride upon one surface thereof, said evaporated fluoride condensing thereupon, evaporating in said evacuated enclosure in the region of said substrate a quantity of phosphorous pentoxide to cause by reaction with said fluoride layer a luminescent phosphor selected from the group consisting of zinc phosphate and magnesium phosphate.

References Cited in the file of this patent

UNITED STATES PATENTS

| | | |
|---|---|---|
| 2,706,691 | Schaefer | Apr. 19, 1955 |
| 2,709,766 | Nagy et al. | May 31, 1955 |
| 2,780,600 | Wollentin | Feb. 5, 1957 |
| 2,789,062 | Cusano et al. | Apr. 16, 1957 |